(12) United States Patent
Mehra (10) Patent No.: US 10,959,037 B1
(45) Date of Patent: Mar. 23, 2021

(54) GAZE-DIRECTED AUDIO ENHANCEMENT

(71) Applicant: Facebook Technologies, LLC, Menlo Park, CA (US)

(72) Inventor: Ravish Mehra, Tacoma, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/722,634

(22) Filed: Dec. 20, 2019

Related U.S. Application Data

(63) Continuation of application No. 15/865,079, filed on Jan. 8, 2018, now Pat. No. 10,555,106.

(60) Provisional application No. 62/451,633, filed on Jan. 27, 2017.

(51) Int. Cl.
| | |
|---|---|
| *H04S 7/00* | (2006.01) |
| *H04S 3/00* | (2006.01) |
| *H04R 5/04* | (2006.01) |
| *H04R 5/033* | (2006.01) |
| *H04R 1/40* | (2006.01) |
| *H04R 1/10* | (2006.01) |
| *H04R 3/00* | (2006.01) |
| *G06F 3/01* | (2006.01) |

(52) U.S. Cl.
CPC .............. *H04S 7/304* (2013.01); *G06F 3/013* (2013.01); *H04R 1/1041* (2013.01); *H04R 1/406* (2013.01); *H04R 3/005* (2013.01); *H04R 5/033* (2013.01); *H04R 5/04* (2013.01); *H04S 3/008* (2013.01); *H04S 2400/01* (2013.01); *H04S 2400/11* (2013.01); *H04S 2400/15* (2013.01); *H04S 2420/01* (2013.01)

(58) Field of Classification Search
CPC ...... H04S 7/304; H04S 3/008; H04S 2400/01; H04S 2400/11; H04S 2400/15; H04S 2420/01; G06F 3/013; H04R 3/005
See application file for complete search history.

(56) References Cited

U.S. PATENT DOCUMENTS

| | | | |
|---|---|---|---|
| 2015/0088500 A1 | 3/2015 | Conliffe | |
| 2015/0230026 A1* | 8/2015 | Eichfeld | ................ H04R 5/027 381/26 |
| 2015/0249898 A1 | 9/2015 | Horbach | |
| 2016/0080874 A1 | 3/2016 | Fullam | |

* cited by examiner

*Primary Examiner* — David L Ton
(74) *Attorney, Agent, or Firm* — Fenwick & West LLP (57) ABSTRACT

Embodiments relate to a headset that filters sounds according to a direction of a gaze of a user wearing the headset. The user wears the headset including an eye tracking unit and one or more microphones. The eye tracking unit tracks an orientation of an eye of the user to determine the direction of the gaze of the user. The direction of the gaze may be different from a facing direction of the headset. According to the determined direction of the gaze of the user, input sound signals generated by the microphones can be beamformed to amplify or emphasize sound originating from the direction of the gaze.

20 Claims, 5 Drawing Sheets

GAZE-DIRECTED AUDIO ENHANCEMENT

CROSS REFERENCE TO RELATED APPLICATION

This application is a continuation of co-pending U.S. application Ser. No. 15/865,079, filed Jan. 8, 2018, which claims the benefit of U.S. Provisional Application No. 62/451,633, filed on Jan. 27, 2017, each of which is incorporated by reference in its entirety.

BACKGROUND

This disclosure relates generally to an audio reproduction system and specifically relates to a system that selectively reproduces an audio from a particular direction.

In an environment with multiple sound sources, a listener may encounter trouble tuning into a particular sound source while tuning out sounds from other sound sources. Such phenomenon is known as a cocktail party effect. Although binaural processing of sounds detected at left and right ears enable auditory focusing to a certain degree, it becomes increasingly difficult to decipher sound from a source of interest as the number of sound sources and the level of interfering sound increases.

The cocktail party effect may pose a more acute problem for people with partial hearing loss. The hearing loss may be attributable to factors such as aging, trauma and hereditary defects. People with hearing impairment would be more severely impacted when there are sound sources that interfere with the sound source that the person wants to tune in.

SUMMARY

One or more embodiments relate to a headset that can perform sound enhancement or noise suppression based on a gaze of a user.

In one or more embodiments, the headset includes a frame, an eye tracking unit coupled to the frame, one or more microphones, and an audio processor. The eye tracking unit is configured to determine a direction of a user's gaze. The one or more microphones are secured to or enclosed in the frame to detect sounds and generate input audio signals corresponding to the detected sounds. Each of the input audio signals electrically describes a corresponding sound received at a corresponding microphone of the one or more microphones. The audio processor communicates with the one or more microphones to receive the input audio signals. The audio processor is configured to process the input audio signals based on the determined direction of the gaze to generate an output audio signal electrically describing a sound originating from a sound source in the direction of the user's gaze amplified relative to another sound originating from another sound source not in the direction of the user's gaze. The headset may further include a speaker communicating with the audio processor. The speaker may be configured to reproduce a sound according to the output audio signal.

BRIEF DESCRIPTION OF THE DRAWINGS

Figure (FIG. 1 is a diagram illustrating use of a headset in environment with multiple sound sources, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments relate to a headset that modifies sounds according to a direction of a gaze of a user wearing the headset. The user wears the headset including an eye tracking unit and one or more microphones. The eye tracking unit tracks an orientation of an eye of the user to determine the direction of the gaze of the user. The direction of the gaze may be different from a facing direction of the headset. According to the determined direction of the gaze of the user, input sound signals generated by the microphones can be beamformed to amplify or emphasize sound originating from the direction of the gaze.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers. In some embodiments, the headset system includes a neckband that handles processing offloaded to it from other devices in the system. The neckband includes a first arm, a second arm, a power source, and a computation capability. Offloading power (e.g., battery location), computation, and additional features from devices in the headset system to the neckband device reduces weight, heat profile and form factor of those devices while still retaining full AR, VR, and/or MR functionality. The neckband also allows for additional features that supplement the AR, VR and/or MR experience of the user, besides simply the optical elements and sensors within the headset system. The neckband device may also be capable of use independently of the headset system, and can produce its own AR, VR and/or MR experience for the user, which may be audio or visual based AR, VR and/or MR. Since a neckband device may be less invasive to a user than the headset system, the user may tolerate wearing the neckband device for greater lengths of time than the headset system, allowing the AR, VR and/or MR environment to be incorporated more fully into a user's day to day activities.

System Overview

Figure 1:
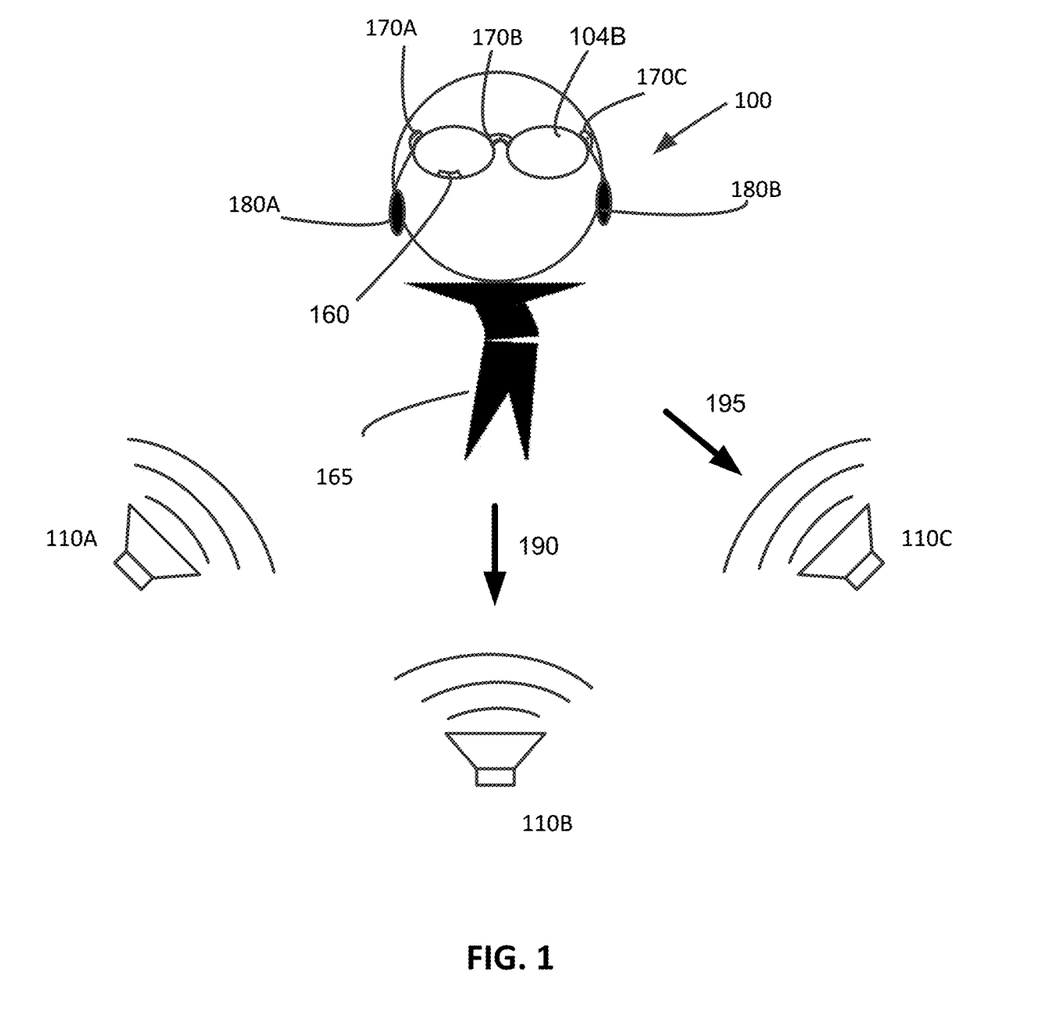

Figure (FIG. 1 is a diagram illustrating use of a headset 100 in environment with multiple sound sources, in accordance with an embodiment. The headset 100 may be an 'augmented reality' headset that enables its user 165 to view computer generated images overlapped on top of an actual outside view of the world. The headset 100 may be a stand-alone device or it may rely on assistance from other devices (e.g., a smartphone) for operation.

As illustrated in FIG. 1, the user 165 is surrounded by multiple sound sources 110A, 110B, 110C, which collectively produce sounds that may be incoherent when listened to all at once. The sound sources 110 may comprise various entities including, for example, persons, speakers, animals, and mechanical devices. Among these sound sources, the user 165 may want to tune into a particular sound source (e.g., sound source 110B). Typically, the sound source that the user 165 wants to tune into coincides with the user's gaze direction. Hence, embodiments described herein amplify sounds coming from a sound source lying in the direction of the user's gaze while suppressing sounds from other sources, as described below in detail with reference to FIG. 2A.

Figure 2A:
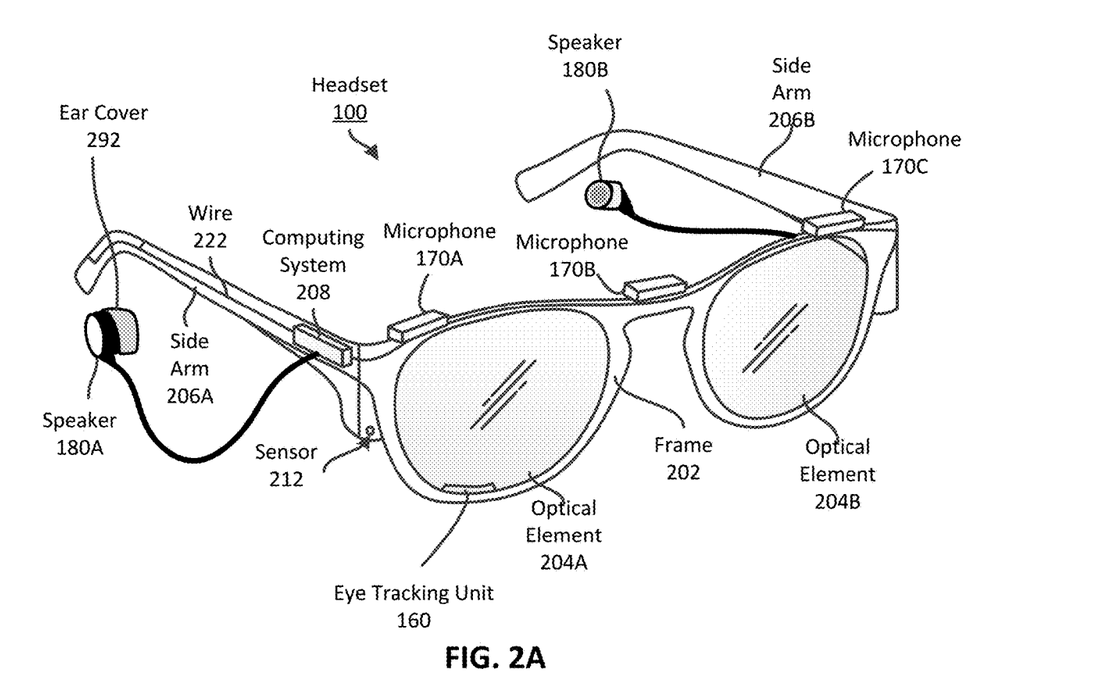
FIG. 2A is a perspective view of a head mounted display that directionally filters sounds, in accordance with an embodiment.
Figure 2B:
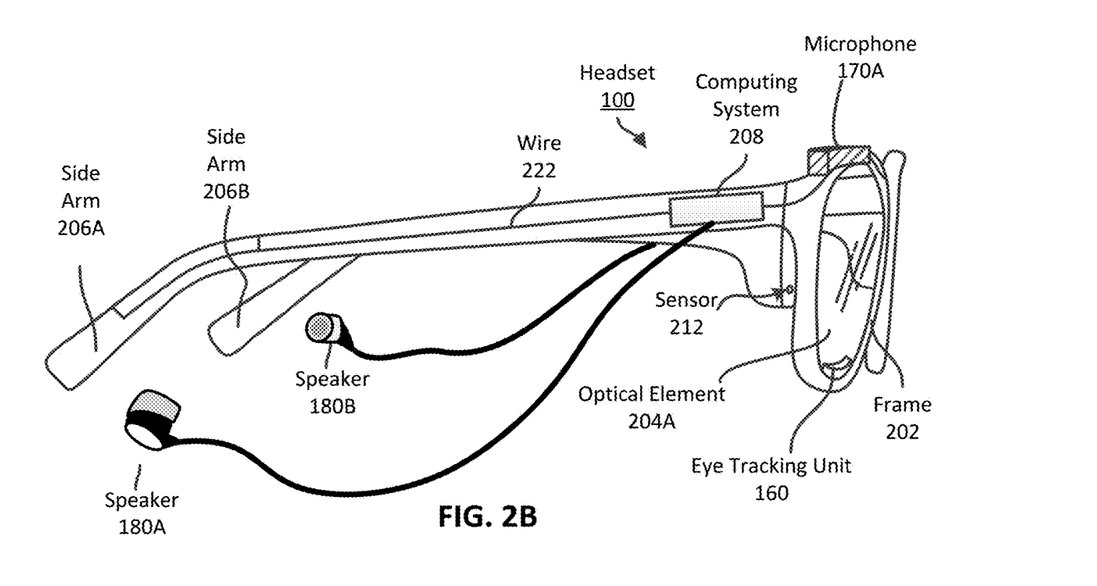
FIG. 2B is a side view of the head mounted display of FIG. 2A, in accordance with an embodiment.

FIG. 2A illustrates a perspective view of a headset 100, according to one embodiment. FIG. 2B illustrates a side view of the headset 100, according to one embodiment. The headset 100 may include, among other components, a frame 202, a computing system 208, an eye tracking unit 160, an array of microphones 170A, 170B, 170C (hereinafter collectively referred to as "microphones 170"), a pair of speakers 180A and 180B, a sensor 212 and optical elements 204A, 204B. These components operate, in conjunction, to at least detect the user's gaze direction, and amplify sounds from sound sources in the gaze direction while suppressing sounds from sound sources in other directions. The headset 100 may include various components not illustrated in FIG. 2A, such as a battery recharge interface.

The frame 202 is a mechanical body comprising one or more members that enclose or attach various other components of the headset 100. The frame 202 is dimensioned and shaped so that the headset 100 can be comfortably secured to a user's head, more specifically, onto the user's nose and ears. The frame 202 has a front portion as well as right and left side arms 206A and 206B (hereinafter collectively referred to as "side arms 206"). The front portion secures right and left optical elements 204A and 204B (hereinafter collectively referred to as "optical elements 204"). The side arms 206 are connected to the frame 202.

The eye tracking unit 160 is a hardware component or a combination of hardware and software components that tracks movement of the user's one or more eyes to determine the direction of the user's gaze. As illustrated in FIG. 2A, the eye tracking unit 160 may be disposed below the optical element 204A, and may be hidden from outside view. Alternatively, the eye tracking unit 160 may be placed on other parts of the frame 202.

The microphone 170 is a hardware component that detects a sound and converts the sound into an input audio signal. Each input audio signal electronically describes a sound received at a respective microphone 170. The one or more microphones 170 may be implemented as discrete components as shown in FIG. 2A. Alternatively, the microphones 170 may be embedded as part of the frame 202 or other components of the headset 100. Although the microphones 170 in FIG. 2A are disposed on the top of the front portion of the frame 202, the microphones 170 may be placed at different locations of the headset 100. In one example, the microphones 170 are implemented as microelectromechanical (MEMS) microphones.

In one embodiment, each of the microphones 170 is a directional microphone which primarily picks up sound from a specific direction. At least two of the unidirectional microphones may be aligned to have different primary directions of sensitivity so that each microphone picks up different sounds. In other embodiments, one or more of the microphones 170 are omnidirectional microphones.

The microphones 170 may be visible from outside, or embedded in the frame 202 and not visible from the outside. Although FIG. 2A illustrates three microphones 170A, 170B, 170C as being provided, two or more than three microphones may be provided.

The speaker 180 is hardware component that reproduces a sound according to an output audio signal received from the computing system 208. The output audio signal is an electrical signal describing how to generate a sound. The output audio signal may be transmitted from the computer system 208 via wires 222 extending along the side arms 206A, 206B. Each of the speakers 180 may be coupled to a corresponding side arm 206 of the headset 100 as a permanent fixture or a detachable module. When the headset 100 is worn by the user, each speaker 180 may be situated near a corresponding auditory canal. The speaker 180 may be partially embedded by or coupled to an earplug 292 as illustrated in FIG. 2A. Alternatively, the speaker 180 may be partially enclosed by an ear cover of an on-ear headphone that covers the entire ear. Hence, sounds from the sound sources 110A, 110B, and 110C may be muffled by the ear cover or the earplug, while a sound output from the speaker 180 can be propagated to the auditory canal. In some embodiments, the speaker 180 is based on bone conduction or cartilage conduction that keeps the ear canal open.

The computing system 208 may be a hardware component or a combination of hardware and software components that performs various computation operations associated with the operation of the headset 100. One of the operations performed by the computing system 208 is processing input audio signals received from the microphones 170 to generate output audio signals for speakers 180, as described in detail with reference to FIG. 2D.

The sensor 212 is a hardware component that detects various physical properties associated with the headset 100. The sensor 212 may include one or more global positioning systems (GPS), magnetometers (compasses), gyroscopes, accelerometers, and the like. Measurement obtained by the sensor 212 can be used for determining an orientation of the headset 100. As illustrated in FIG. 2A, the sensor 212 is positioned in the front portion of the frame 202. However, in alternate configurations, the sensor 212 may be positioned in another part of the frame 202.

The optical elements 204 are elements through which the user can obtain visual information. The optical elements 204 are secured to a front portion of the frame 202. The optical elements 204 may be passive optical elements through which the user can view objects. Alternatively, the optical elements 204 may be an active display element that presents an image to the user. In some embodiments, the optical elements 204 are passive optical elements that are transparent or semi-transparent. Passive optical elements may be concave or convex lenses that refract light. In some embodiments, a display (e.g., LCD, LED, or OLED) may be coupled to a portion of a surface of the passive optical element to present a computer generated image to the user eyes.

In some embodiments, the optical elements 204 are active display elements (or electronic displays) that project light to user eyes. The display elements may be transparent displays, semi-transparent displays, or non-transparent displays (e.g., LCD, LED, OLED or any combination of them). The transparent displays present a computer generated image to the user eyes on a portion of the transparent displays, while allowing the user to view real objects through the transparent display. The non-transparent displays present a computer generated image to the user eyes through the non-transparent displays, while preventing real objects to be seen through the non-transparent displays.

In some embodiments, the headset 100 allows the user to experience a virtual reality, an augmented reality or both. For example, the headset 100 includes a camera, e.g., coupled to the frame 202 adjacent to the sensor 212, that captures an image corresponding to a perspective view from the headset 100, and the computing system 208 generates an output image according to the captured image. The output image may include a virtual object not present in the perspective view from the headset 100. The transparent display may present the output image of the virtual object on a portion of the transparent display to the user eyes, while also allowing the user to view real objects through the transparent display. Alternatively, the non-transparent display may present the output image including a replicated view captured by the camera and a virtual object, while preventing the user to actually see through the non-transparent display. The output image including the virtual object together with the perspective view from the headset 100 allows the user to experience an augmented reality. The non-transparent display may display the output image including only virtual objects according to an orientation of the headset 100 determined by the sensor 212 to allow the user to experience a virtual reality.

Figure 2C:
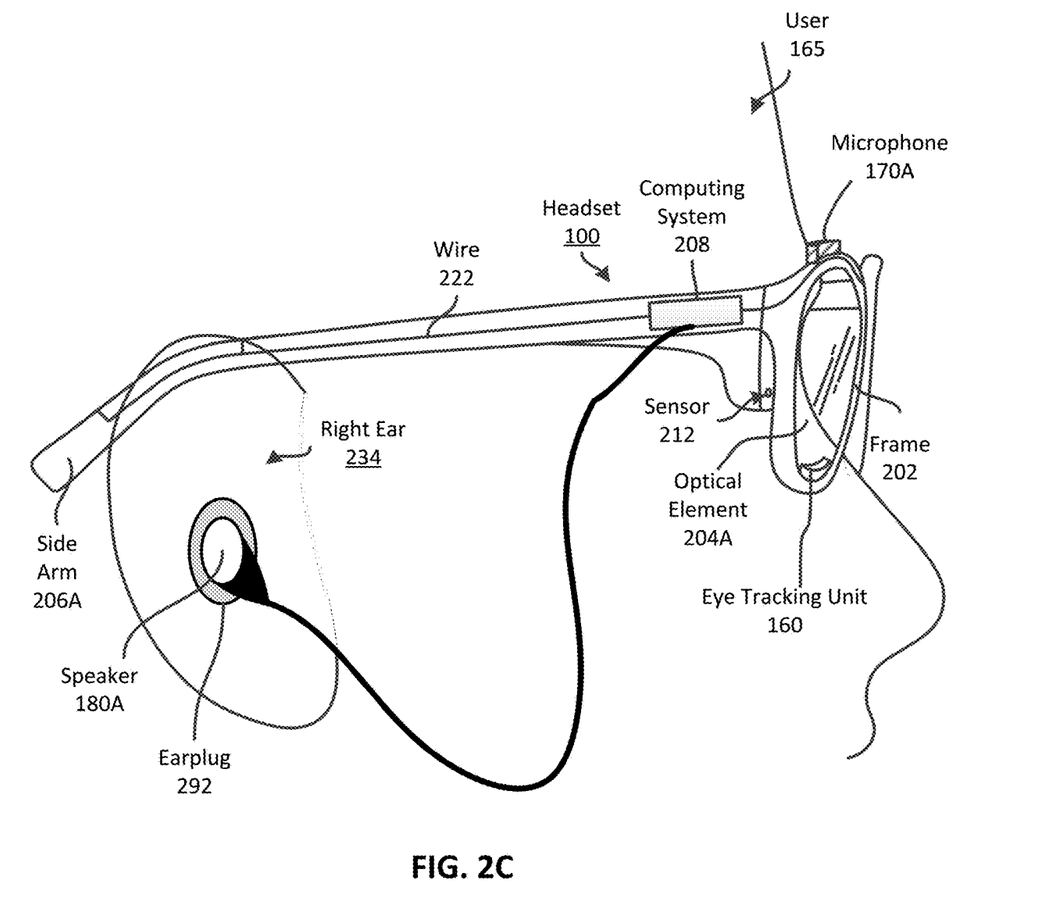
FIG. 2C is a side view of the head mounted display of FIG. 2A worn by a user, in accordance with an embodiment.

FIG. 2C is a diagram illustrating the placement of headset 100 when worn by a user 165, according to one embodiment. When the headset 100 is worn by the user as shown in FIG. 2C, the side arms 206 are positioned behind the ears of the user and secure the headset 100 to the user. The headset 100 is secured to the user 165 by having the side arms 206 resiliently press against a right ear region and a left ear region (not shown) of the user 165. In one embodiment, the right side arm 206A is positioned behind the right ear 234 of the user 165 and comes into contact with the right ear region of the user 165. Similarly, the left side arm 206B is positioned behind the left ear (not shown) of the user 165 and comes into contact with the left ear region (not shown) of the user 165.

The eye tracking unit 160 determines a direction of a gaze of a user by tracking the user's eye. In one embodiment, the eye tracking unit 160 includes a structured light emitter and a camera (not shown for simplicity) facing the user's eye. The structured light emitter may emit a structured light pattern onto a portion of the user's eye. Depending on an orientation of the eye, the pattern reflected on the eye may change. The camera may capture an image of the portion of the user's eye, and the eye tracking unit 160 can analyze the image to determine the orientation of the eye. Moreover, the eye tracking unit 160 can determine the direction of the gaze of the user based on the determined orientation of the eye.

In one or more embodiments, different components than shown in FIGS. 2A through 2C are implemented. For example, two or more of the components shown in FIGS. 2A through 2C may communicate with each other through a wireless channel without the wire 222.

Processing of Sound Signals

Figure 2D:
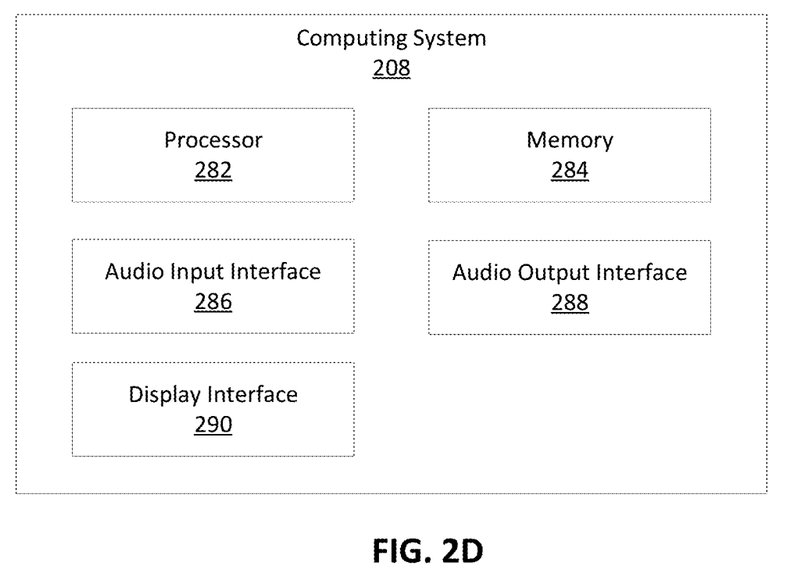
FIG. 2D is a block diagram of the computing system for processing the input audio signals received from the microphones, in accordance with an embodiment.

FIG. 2D is a block diagram of the computing system 208 for processing the input audio signals received from the microphones 170. The computing system 208 includes, among other components, a processor 282, a memory 284, an audio input interface 286, an audio output interface 288, a display interface 290, and etc.

The memory 284 is a non-transitory computer-readable storage medium storing instructions executable by the processor 282. The instructions executed by the processor 282 cause the processor 282 to (i) receive the input audio signals through the audio input interface 286, (ii) process the input audio signals to generate the output audio signals, and (iii) transmit the output audio signals to the speakers 180 through the audio output interface 288.

The audio input interface 286 is a hardware component or a combination of hardware and software components that interfaces with the microphones 170. The audio input interface 286 receives input audio signals from the microphones 170, and transfers the received audio signals to the processor 282. Additionally, the audio input interface 286 may control operations of the microphones 170, according to the processor 282.

The processor 282 receives the input audio signals from the audio input interface 286, and generates the output audio signals based on the input audio signals. The processor 282 may perform beamforming based on the direction of the gaze to generate the output audio signals. Moreover, the processor 282 may perform additional audio processing (e.g., amplification, channel conversion, or head related transfer function (HRTF) transformation) to generate the output audio signals. The processor 282 transmits the output audio signals to the audio output interface 288 for reproducing sound.

In one embodiment, the processor 282 performs beamforming by controlling the operations of the microphones 170 to selectively receive an input audio signal from a microphone 170 corresponding to the determined direction of the gaze. Assuming for an example that the user gazes at a direction corresponding to the microphone 170C, the processor 282 enables the microphone 170C while disabling the other microphones 170A, 170B, then receives the input audio signal generated by the microphone 170C. In addition, the processor 282 may generate an output audio signal according to the input audio signal from the enabled microphone 170. In some embodiments, the processor 282 controls a gain setting of each of the microphones 170 or applies transformations (e.g., a linear transformation or other audio signal transformations) to the signals of the microphones 170 according to the direction of the gaze.

In another embodiment, the processor 282 performs beamforming by mixing input audio signals generated by different microphones and/or filtering out sounds originating from directions other than the determined direction of the gaze. Assuming for an example that the user gazes at a direction aligned with a more sensitive direction of the microphone 170C, the processor 282 receives input audio signals from the microphones 170A, 170B, 170C, and then performs processing on the input audio signal generated at the microphone 170C by cancelling out input audio signals generated by the microphones 170A, 170B. The processor 282 may mix the input audio signals from different microphones with different weights according to the direction of the gaze. That is, the input audio signal generated from the microphone closely aligned with the direction of the gaze is given a higher weight value (e.g., higher gain) while the input audio signal generated from the microphone with its sensitive direction furthest deviating from the direction of gaze is given a lower weight value (e.g., lower gain) or even a negative weight value. In addition, the processor 282 may generate an output audio signal according to the processed audio signal. In some embodiments, the processor 282 performs additional audio processing on the input audio signal to generate the output audio signal. For example, the processor 282 amplifies or delays an input audio signal from a microphone 170 corresponding to a direction of a user gaze with respect to input audio signals from other directions. For another example, the processor 282 converts the input audio signal comprising a mono channel into the output audio signal with stereo channels. For another example, the processor 282 performs HRTF transformation to generate spatial audio signal. Assuming for an example that an input audio signal is generated by a microphone according to a sound from a sound source at a certain location, the computing system 208 performs spatial transformation on the input audio signal such that the user listening to the sound reproduced by the speaker 180 according to the spatially transformed audio signal can perceive that the sound as originating from that certain direction or location.

The audio output interface 288 is a hardware component or a combination of hardware and software components that interfaces with the speakers 180. In particular, the audio output interface 288 receives the output audio signals from the processor 282, and transfers the output audio signals to the speakers 180 for generating sounds.

The display interface 290 is a hardware component or a combination of hardware and software components that interfaces with a video source and a display. The video source may be embodied in the memory 284 or in an external storage, and may store content of an augmented reality, a virtual reality, or both. The display may be part of the optical elements 204 or an external display as described above with respect to FIG. 2B. The display interface 290 may receive a video signal from the video source, and transmits the video signal to the display. The video signal electrically describes how to render a visual representation of an image. In some embodiments, the display interface 290 operates in conjunction with the audio output interface 288 according to the processor 282 to present a synchronized image and sound of an augmented reality, virtual reality, or both to the user.

Method of Processing Sound Signals

Figure 3:
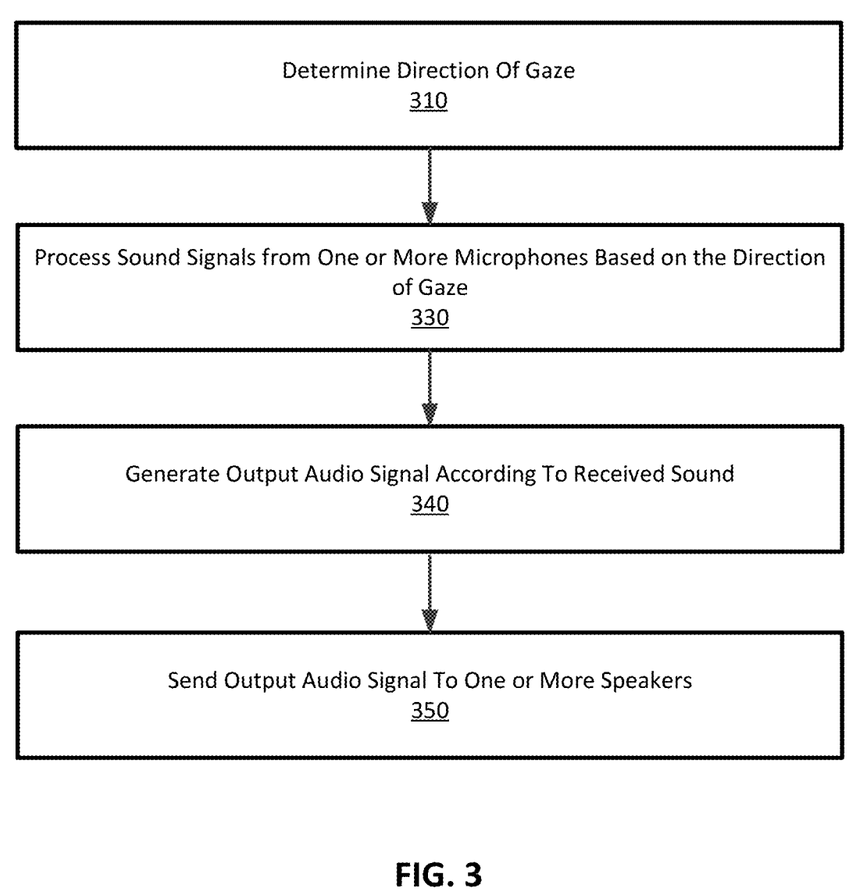
FIG. 3 is a flow chart of a process of selectively reproducing sound according to a direction of a gaze of a user wearing the headset, in accordance with an embodiment.

FIG. 3 is a flow chart of a process of selectively reproducing sound according to a direction of a gaze of a user wearing the headset 100, in accordance with an embodiment. The steps in FIG. 3 may be performed by the headset 100 or a separate computing device communicating with the headset 100.

The headset 100 determines 310 a direction of a gaze of the user. The headset 100 determines 310 a direction of a gaze by the eye tracking unit 160 as described above with respect to FIG. 2C. In some embodiments, the headset 100 determines the gaze of the user, while an image of virtual reality or augmented reality is displayed by the headset 100.

The headset 100 processes 330 sound signals from multiple microphones according to the determined direction of the gaze. The processing may include, for example, blocking sound signals from one or more microphones, transforming, filtering and/or mixing sound signals from one or more microphones with different weights, and/or canceling out sound signals generated by one or more microphones from the mixed sound signal.

The headset 100 generates 340 an output audio signal based on the input audio signal (and/or processed input audio signal) and the output audio signal electrically representing how to drive a speaker. In one example, the headset 100 performs additional audio processing on the input audio signal to (i) amplify the input audio signal, (ii) delay the input audio signal, (iii) convert a number of channels in the input audio signal, (iv) perform HRTF transformation, or (v) any combination of them.

The headset 100 reproduces 350 a sound, according to the output audio signal. The output audio signal electrically describes a sound originating from a sound source in the direction of the user's gaze amplified relative to another sound originating from another sound source not in the direction of the user's gaze. According to the output audio signal, sound originating from the sound source in the direction of the user's gaze can be reproduced by the speaker coupled to a user ear, while noise from sound sources in different directions is suppressed by an ear cover or an earplug 292.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure. For example, the optical elements 204, and the sensor 212 may be omitted. For another example, although an eye tracking unit 160 employing a structured light is disclosed in herein, other types of eye tracking unit 160 may be implemented instead. For another example, the side arms 206A, 206B may be replaced by an elastic band that can secure the frame 202 to the user's head.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A headset system, comprising:
   two or more microphones configured to detect input sounds and generate the input audio signals corresponding to the detected input sounds;
   a processor communicating with the two or more microphones to receive the input audio signals, the processor configured to selectively disable a subset of the two or more microphones based on a signal indicative of a direction of interest and to process the input audio signals based on the signal indicative of a direction of interest and a head related transfer function (HRTF) transformation to generate an output audio signal; and
   an audio output interface configured to send the output audio signal to one or more speakers to produce an output sound that is perceived by a user of the headset as originating from the direction of interest.

2. The headset of claim 1, further comprising:
   a frame; and a sensor coupled to the frame and configured to generate the signal representing the direction of interest.

3. The headset of claim 2, wherein the two or more microphones are secured to the frame.

4. The headset of claim 2, wherein the two or more microphones are disposed in an array on the frame.

5. The headset of claim 1, further comprising an eye tracking unit, wherein the direction of interest corresponds to a direction of a gaze of the user determined by the eye tracking unit.

6. The headset of claim 1, wherein the processing of the input audio signals by the processor comprises performing beamforming based on the direction of interest.

7. The headset of claim 1, wherein the processing of the input audio signals by the processor comprises:
   determining a microphone with a primary direction sensitivity corresponding to an input sound originating from the direction of interest; and
   attenuating an input audio signal from at least one microphone other than the determined microphone to generate the output audio signal.

8. The headset of claim 1, wherein the processing of the input audio signals by the processor comprises at least one of transforming, filtering, and mixing the input audio signals with different weights according to the direction of interest.

9. The headset of claim 1, wherein the processing of the input audio signals by the processor comprises attenuating an input audio signal from a mixed audio signal of two or more input audio signals according to the direction of interest, the input audio signal corresponding to an input sound originating from a direction different from the direction of interest.

10. The headset of claim 1, wherein the processing of the input audio signals by the processor comprises applying linear transformations to the input audio signals according to the direction of interest.

11. The headset of claim 1, wherein the audio output interface is configured to communicate with at least two speakers that generate a stereo sound of an input sound originating from the direction of interest.

12. A method comprising:
   determining, by a sensing unit, a direction of interest of a user of a headset;
   disabling, by a processor, a subset of microphones of the headset based on the determined direction of interest;
   generating, by the processor, an output audio signal by processing input audio signals corresponding to input sounds originating from different directions with respect to an orientation of the user based on the determined direction of interest and a head related transfer function (HRTF) transformation; and
   sending, by an audio output interface, the output audio signal to two or more speakers to reproduce an output sound that is perceived by the user as originating from the determined direction of interest.

13. The method of claim 12, wherein the sensing unit is an eye tracking unit and the determined direction of interest corresponds to a direction of a gaze of the user determined by the eye tracking unit.

14. The method of claim 12, wherein the microphones are secured to a frame of the headset.

15. The method of claim 12, detecting, by the microphones, input sounds and generating input audio signals corresponding to the detected input sounds.

16. The method of claim 12, wherein generating the output audio signal by processing the input audio signals further comprises: performing beamforming based on the determined direction of interest.

17. The method of claim 12, wherein generating the output audio signal by processing the input audio signals further comprises:
   determining a microphone with a primary direction of sensitivity corresponding to an input sound originating from the determined direction of interest; and
   attenuating an input audio signal from at least one microphone other than the determined microphone to generate the output audio signal.

18. The method of claim 12, wherein generating the output audio signal by processing the input audio signals further comprises:
   determining a microphone with a primary direction of sensitivity corresponding to an input sound originating from the determined direction of interest; and
   amplifying an input audio signal from the determined microphone to generate the output audio signal.

19. A non-transitory computer readable storage medium comprising instructions that when executed by one or more computer processors cause the one or more processors to:
   determine, by a sensing unit, a direction of interest of a user of a headset;
   disable, by a processor, a subset of microphones of the headset based on the determined direction of interest;
   generate, by the processor, an output audio signal by processing input audio signals corresponding to input sounds originating from different directions with respect to an orientation of the user based on a determined direction of interest of the user and a head related transfer function (HRTF) transformation; and
   send, by an audio output interface, the output audio signal to two or more speakers to reproduce an output sound that is perceived by the user as originating from the determined direction of interest.

20. The non-transitory computer readable storage medium of claim 19, wherein the sensing unit is an eye tracking unit and the determined direction of interest corresponds to a direction of a gaze of the user determined by the eye tracking unit.

* * * * *